United States Patent [19]
West

[11] 3,800,733
[45] Apr. 2, 1974

[54] MARINE COUPLING
[75] Inventor: Harold H. West, Seattle, Wash.
[73] Assignee: Sea-Link Incorporated, Seattle, Wash.
[22] Filed: Sept. 27, 1972
[21] Appl. No.: 292,530

[52] U.S. Cl. ......... 114/235 A, 213/75 R, 24/263 B, 24/263 LL, 24/248 D, 24/211 P
[51] Int. Cl. ............................................. B63b 21/60
[58] Field of Search ............ 114/230, 235 A, 235 R; 213/75 R; 105/3; 280/504, 507, 511, 512, 513, 514; 24/263 B, 68 T, 263 LL, 248 F, 248 D, 248 B, 211 P; 287/87

[56] References Cited
UNITED STATES PATENTS

| 3,430,601 | 3/1969 | Thompson | 114/235 R |
| 2,130,100 | 9/1938 | Rasmussen | 280/511 |
| 3,489,432 | 1/1970 | Karlstrom | 280/504 |
| 3,257,985 | 6/1966 | Glosten | 114/235 R |
| 1,883,696 | 10/1932 | Goertz | 280/504 |
| 1,618,401 | 2/1927 | Baer | 114/235 A |
| 2,179,432 | 11/1939 | Schroeder et al | 280/511 |

FOREIGN PATENTS OR APPLICATIONS

| 663,925 | 8/1929 | France | 24/68 T |
| 258,865 | 4/1970 | U.S.S.R. | 114/235 R |

Primary Examiner—George E. A. Halvosa
Assistant Examiner—Edward R. Kazenske
Attorney, Agent, or Firm—Robert W. Beach

[57] ABSTRACT

The hook of a ball coupling component is engageable with a boss upstanding from the bottom of a socket component. In such latched relationship of the components the attachments of the ball and socket components can move relatively through a small angle about a vertical diametral axis through the ball and through a considerable angle about a horizontal diametral axis through the ball. Such hook is moved into latching engagement with such boss by swinging of a lever which can be held in latched position by locking of a toggle clamp. The lever can be swung manually or by a fluid-pressure jack, and the same jack can be relocated to swing the locking means relative to the latching lever.

5 Claims, 13 Drawing Figures

MARINE COUPLING

The present invention relates to marine coupling, particularly suitable for connecting a towboat to a barge or a barge to another barge, so as to prevent relative rolling and yawing of the coupled vessels, while enabling the connected vessel to pitch relatively.

A general object of the invention is to provide marine coupling means which can be used to connect either a towboat and a barge, or two barges, and which would transmit both pulling and pushing forces between the vessels so connected.

It is a further object to provide marine coupling devices arranged in pairs, such that either coupling can be connected first followed by relative pivoting of parts of such connected coupling to facilitate connecting of the other coupling of the pair.

It is also an object to enable the components of one coupling to pivot relatively in latched relationship for guiding the components of the other coupling of a pair into latching relationship.

Another object is to provide a pair of cooperating couplings joining vessels which will enable the vessels to pitch freely relative to each other, while preventing relative rolling and yawing of the vessels.

Moreover, it is an object to provide a coupling having components which ban be engaged and disengaged quickly, and which components can be held together securely when desired.

A further object is to enable cooperating latched components of a coupling to be locked at will against inadvertent disengagement, but which can be unlocked easily and quickly to enable the coupling components to be disengaged by water action on the connected vessels tending to pull the coupling components apart.

An additional object is to provide power mechanism for effecting latching engagement of cooperating latch members or for effecting locking engagement and/or disengagement of locking members.

Figure 1:
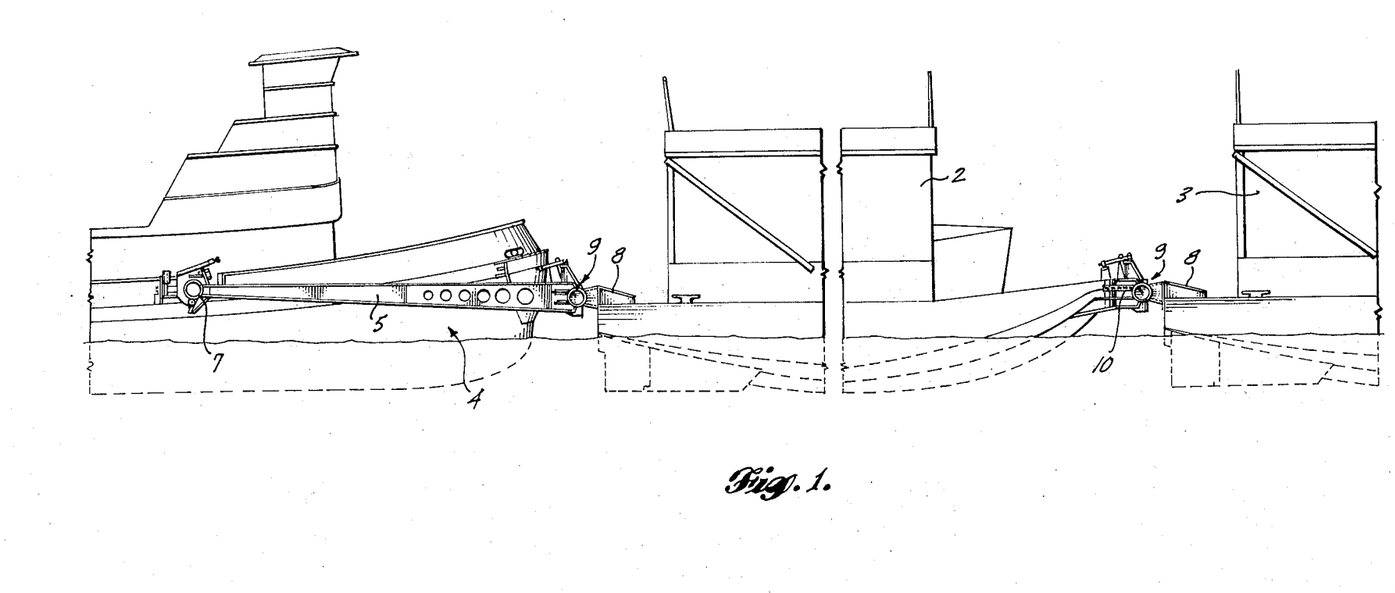
FIG. 1 is a side elevation.
Figure 2:
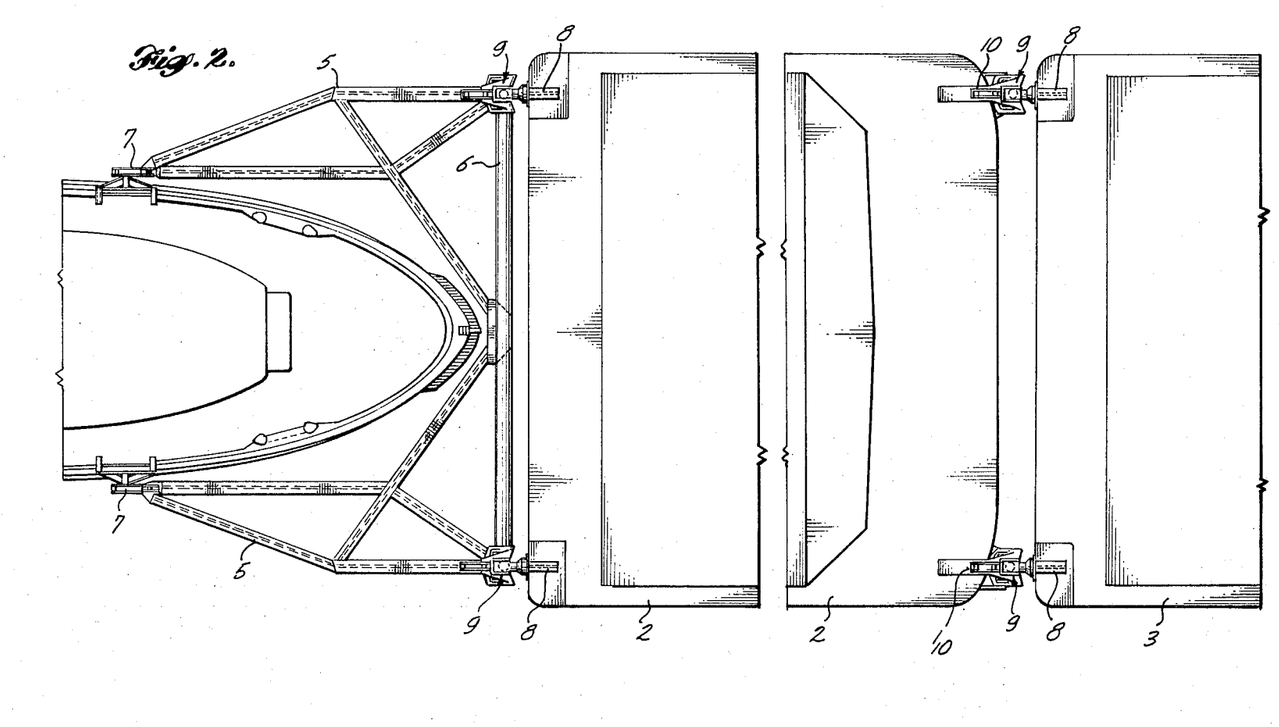
FIG. 2 is a plan of a towboat and barge train, the components of which are connected by the marine coupling of the present invention.
Figure 3:
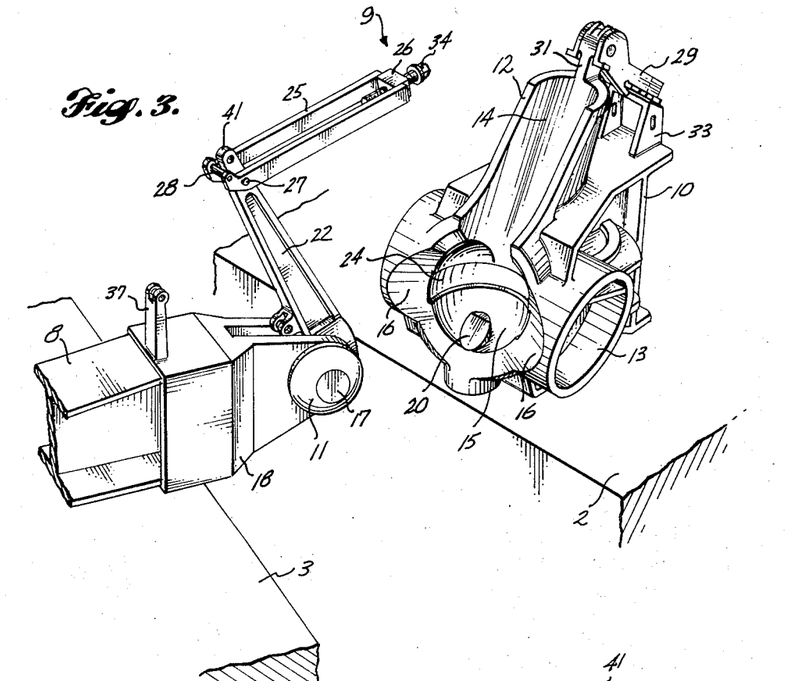
FIGS. 3 and 4 are top perspectives of coacting coupling components, FIG. 3 showing such components in separated relationship and FIG. 4 showing such components in connected relationship.

The marine coupling of the present invention can be used to connect a towboat 1 and a barge 2 or barges 2 and 3, as shown in FIGS. 1 and 2. The towboat 1 is connected to a barge 2 in pushing relationship by a yoking frame 4 including fore-and-aft side-thrust trusses 5, the forward portions of which are connected by a transverse member 6. The aft ends of the thrust trusses are connected by pivots 7 to the opposite sides of the towboat 1, respectively, generally amidships. The couplings of the present invention are used to connect the front portions of the side-thrust trusses 5 to the stern of a barge 2, or to connect the bow portion of a barge 2 to the stern portion of a barge 3 or both.

The barge couplings are usually arranged in pairs, as shown best in FIG. 2, the couplings of each pair being located in relationship spaced transversely of a barge. Each coupling includes a support 8 carrying the projection component of a projection-and-socket coupling 9, and the socket component of the coupling is carried by a support 10. The supports 8 and 10 are spaced apart the same transverse distance on their respective vessels so that the components of each coupling are disposed properly for latching engagement when the adjacent end portions of the vessels are in their relationship shown in FIGS. 1 and 2.

Each coupling is composed of cooperating projection-and-socket components. The projection component carries a generally ball-shaped plug including members 11 in the shape of substantially spherical zones. The socket component is of generally T-shape, including an upwardly projecting hollow trough portion 12 and oppositely projecting hollow tubular portions 13. The socket components of a pair of couplings spaced transversely of a vessel can be connected together by a tube, such as the tube 6 shown in FIG. 2, which can be connected to tubular portions 13 of the couplings by butt welds.

The lower end of the trough-shaped hollow 14 in the upward projection 12 of the coupling socket component is in communication with the upper side of the socket 15 that receives the ball projection 11. The opposite sides 16 of the entrance to socket 15 flare outwardly to guide movement of the ball into the socket.

The spherical zone elements 11 of the coupling projection component are mounted on the opposite reduced end portions of a cross pin pivot 17. Such spherical zone element can be secured to the opposite ends of the pivot by riveting or welding. Such pivot is rotatively carried by a projection 18, which, in turn, is mounted on the support 8, as shown in FIGS. 3 through 7. Such projection 18 facilitates rotation of the pivot 17 and ball elements 11 relative to the projection. The transverse bore through which the pivot extends may have a bearing lining 19, such as of bronze.

Because the end of the projection component is of generally ball shape, and the socket of the socket component is of generally spherical segment shape, complemental to the ball elements, the ball-and-socket component can be engaged by relative approach movement. Latch mechanism is provided for interengagement between the projection-and-socket elements to prevent separation of such elements. The latch mechanism includes an abutment in the socket component projecting from the bottom of the socket into the spherical segment. Such abutment is shown as being formed by the upper end of a pin 20 fixed in the bottom of the socket component. The upper surface of the abutment slopes upwardly toward the closed back of the socket.

The projection component has a hook 21 on the lower end of a lever 22 which is engageable behind the abutment to prevent the projection from being withdrawn from the socket. The lower portion of such lever is pivotally mounted on the pivot pin 17, and its lower end 23 at the root of hook 21 is formed concentrically with the axis of the pivot pin. The radius of such lever hook root is less than the largest radius of the spherical zone elements 11, and the ends of the bifurcations of projection 18 straddling the pivoted end of the lever 22 are of corresponding size, so as to provide a circumferential groove in the central portion of the projection which will pass over the abutment formed by the upper end of the pin 20.

Figure 5:
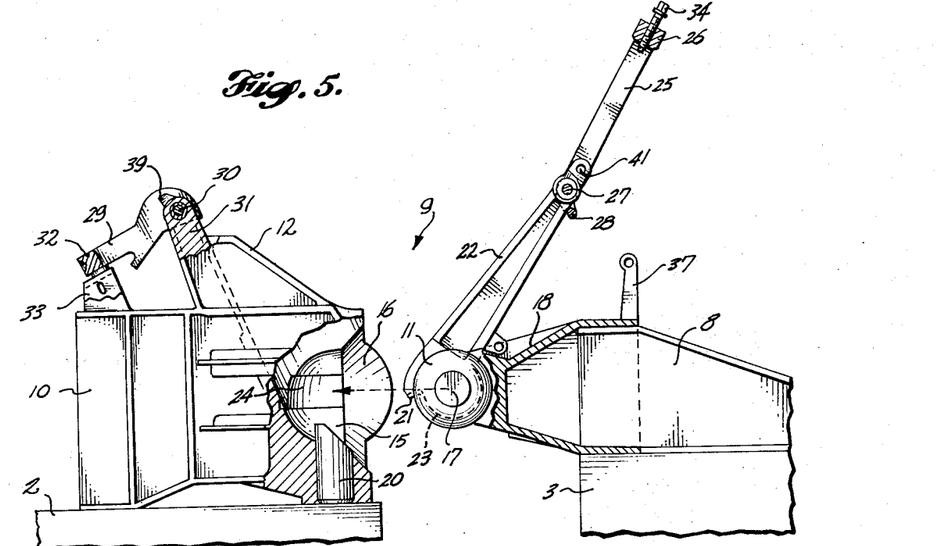
FIG. 5 is a side elevation of the coupling with the components in separated relationship and having parts broken away.
Figures 6, 7:
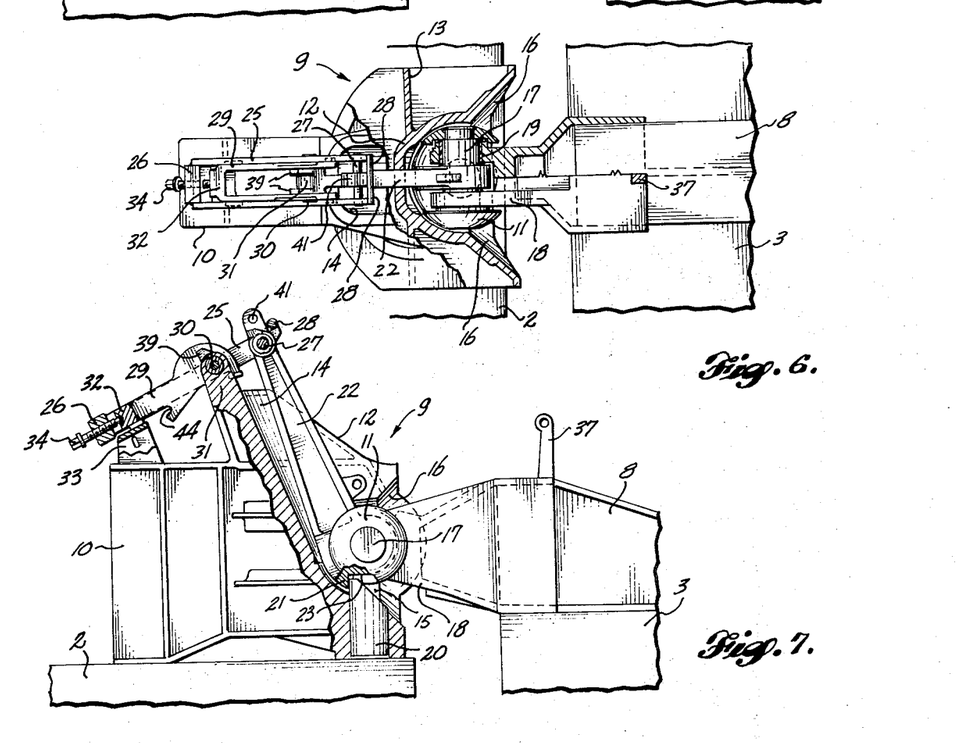
FIG. 6 is a plan and FIG. 7 is a side elevation of the coupling having the components in connected relationship with parts broken away.

The trough or channel 14 of the socket component enables the lever 22 to be swung about the axis of pivot 17 from the position shown in FIG. 5, to that of FIG. 7 for rotating the face of hook 21 down into the position shown in FIG. 7 for latching engagement with the abutment 20. When the projection-and-socket elements are thus engaged and latched, the coupling can transmit great thrust forces from the socket walls to the spherical zone elements 11 and from them through the pivot pin 17 and bifurcations of the projection 18 to the support 8 for the projection coupling component. Also, a reasonable degree of tension force can be transmitted through the coupling in latched condition by way of the contact between hook 21 and abutment 20, because of the short lever arm between the face of the hook and the axis of the lever pivot pin 17.

When vessels are to be connected by a pair of such couplings spaced transversely of the vessels, the vessels can be moved relatively so that one ball component of a coupling is engaged in the socket component of such coupling even though the corresponding components of the other coupling are spaced apart a considerable distance. The lever 22 can then be swung to engage its hook 21 with a boss 20. The ball-and-socket elements thus interengaged can be swung relatively while such coupling serves as a center about which the components of the other coupling of the pair can be moved relatively into engagement guided by the engaged components of the first coupling. When the ball-and-socket components of the second coupling have thus been moved into engagement, the lever 22 of the second coupling is swung from the position of FIG. 3 into the position of FIG. 4 to engage the hook 21 of that coupling with its cooperating abutment 20. The two couplings of the pair are thus engaged for holding the vessels in the desired relationship. Such coupled couplings will prevent relative yawing and rolling of the vessels while allowing free relative pitching of the vessels through a considerable angle about the axis of pivot pins 17.

Figure 4:
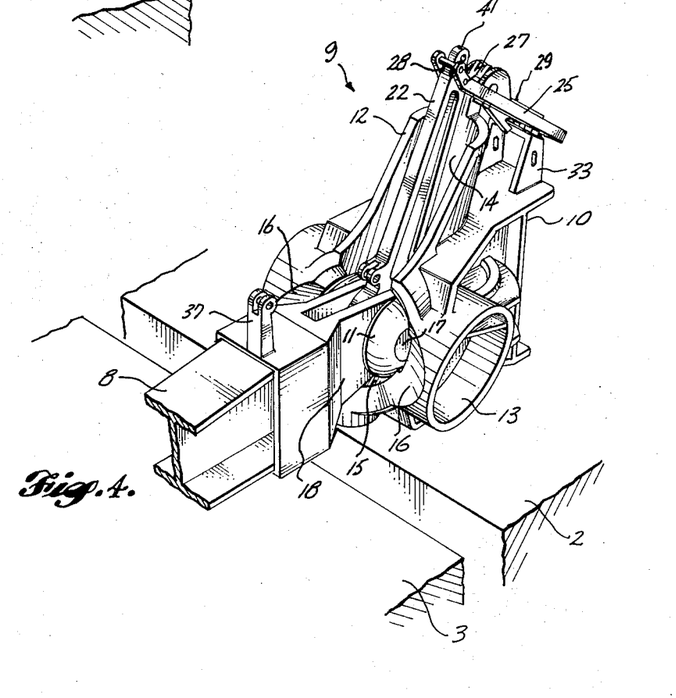

In order to transmit substantial tension forces between the projection-and-socket components, however, it is necessary to lock the lever 22 in the latched position shown in FIGS. 4 and 7. Locking of the latch lever 22 in latched position is effected by a toggle clamp including the tension clevis formed by bifurcations 25 having their root ends connected by a crossbar 26 and their opposite ends connected by a pivot pin 27 to the swinging end portion of lever 22. Normally, the clevis is held in a limiting position relative to lever 22 by a stop rod 28 carried by the ends of the bifurcations beyond the pivot 27 to contact one edge of the lever when the lever is in the generally upright position of FIG. 5.

When the latch lever 22 has been swung into the latching position of FIG. 7 from the unlatched position of FIG. 5, the clevis 25 can be swung about its pivot 27 from the unlocked position of FIG. 5 into the locked position of FIG. 7. The side bars of such clevis are spaced apart sufficiently to pass over bifurcations 29 of a lock strut, corresponding end portions of which are mounted by a pivot pin 30 on the upper portion of post 31 projecting upwardly from the socket component of the coupling. The end of the bifurcations 29 of the strut remote from the pivot 30 are connected by a crossbar 32. Swinging of the strut in the counterclockwise direction is limited by engagement of the crossbar 32 with the rest 33 upstanding from the socket member.

When the lock clevis has been swung in a counterclockwise direction about its pivot 27 relative to latch lever 22 from the relationship shown in FIG. 5 to that of FIG. 7, the bar 32 of the lock strut and the bar 26 of the lock clevis will be disposed in adjacent relationship, as shown in FIG. 7. In such relationship, both bars will have passed over the dead center defined by a line through pivots 27 and 30. Any force exerted on latch lever 22 tending to swing it to the right from the position of FIG. 7 will create a tension force in the clevis sides 25 if crossbar 26 is held stationary.

The end of a bolt 34 extending through bar 26 may bear against crossbar 32 of the lock strut. Tension force in the clevis side 25 will be transmitted in compression through the clevis crossbar 26, the bolt 34 and the lock strut 32 to the lock strut sides 29. Lengthwise movement of such strut sides is prevented by the pivot pin 30 anchoring such strut to the post 31. When the lock clevis and the lock strut are in the overcentered nesting relationship shown in FIG. 7, they cannot inadvertently be swung upward, but together form a toggle clamp. Such mechanism will therefore lock latch lever 22 in the position shown in FIG. 7, in which the hook 21 is held in engagement with the abutment 20 to retain the ball projection component of the coupling in the socket component.

In the manner explained, the toggle clamp will lock together the projection and socket components of the coupling in opposition to the pull of great forces tending to separate such components. At times wind, tide and/or wave action can exert such great forces on connected vessels that it is desirable to disconnect them. It is important that the toggle clamp lock be capable of being released quickly and easily under such circumstances, as well as when it is desired to separate the vessels at a destination. The toggle clamp can be released simply by exerting a prying force between the rest 33 and the overcenter crossbars 26 and 32 to a location above the line of pivots 30 and 27 to unlock the toggle clamp. A substantial pulling force exerted on the coupling by the vessels will swing the toggle clamp members on upward as pressure of abutment 20 on hook 21 swings lever 22 clockwise, as seen in FIG. 7, toward release position. The coupling components will thus be pulled apart.

The projection-and-socket components of the coupling can swing relatively about an upright axis to a limited degree when the latch lever 22 is in the latched position of FIG. 7 if the locking clevis and locking strut have not been placed in locking relationship. Consequently, completion of a connection between two vessels utilizing a pair of couplings spaced transversely of the vessels, as shown in FIGS. 1 and 2, is facilitated. When the projection component of one coupling is inserted into the socket component of such coupling and the latch lever 22 is swung to the position of FIG. 7 to hold the components in such relationship, the vessels can be swung to move the projection component of the second coupling into the socket component of such coupling, and the latch lever of that coupling can be swung into latching position.

The toggle clamp locks of both couplings of the pair can then be swung to the positions shown in FIG. 7 for locking the latch levers 22 in their latching positions. With the coupling components thus retained inseparably, the vessels cannot yaw or roll relative to each other, although they can pitch relatively about the axis of pivots 17. The vessels can be uncoupled readily simply by swinging the toggle clamps upward from a position such as shown in FIG. 7 to separate the lock clevis and the lock strut, and then the latch levers 22 can be swung in a clockwise direction, as seen in FIG. 7, for releasing each hook 21 from its socket abutment 20. The coupling components can then be pulled apart without resistance.

In order to withstand stresses which may be imposed on couplings connecting large vessels in rough seas, it is necessary for the construction of the couplings to be rugged and, consequently, heavy. For such installations, the coupling mechanism can be power operated in accordance with the modified construction shown in FIGS. 8 to 13, inclusive. The construction of the coupling components themselves and the latch mechanism shown in these figures is the same as that described in connection with FIGS. 3 to 7, inclusive. The coupling construction of FIGS. 8 to 12, inclusive, differs only in providing power mechanism for latching and locking the coupling.

Figure 8:
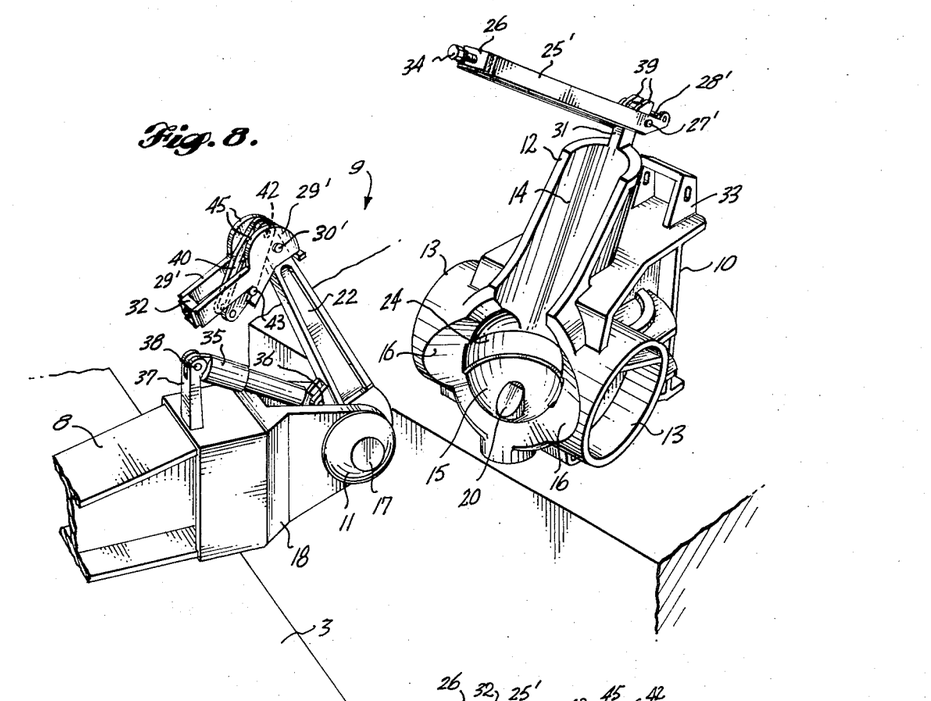
FIG. 8 is a top perspective of the coupling having parts assembled in a somewhat different relationship, showing the coupling components disengaged.
Figure 9:
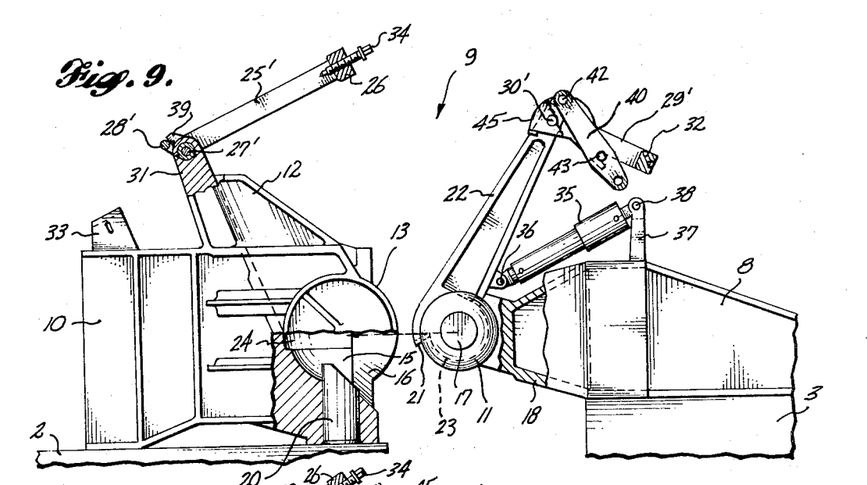
FIG. 9 is a side elevation of the coupling with the components disengaged and having parts broken away.
Figures 10, 12, 13:
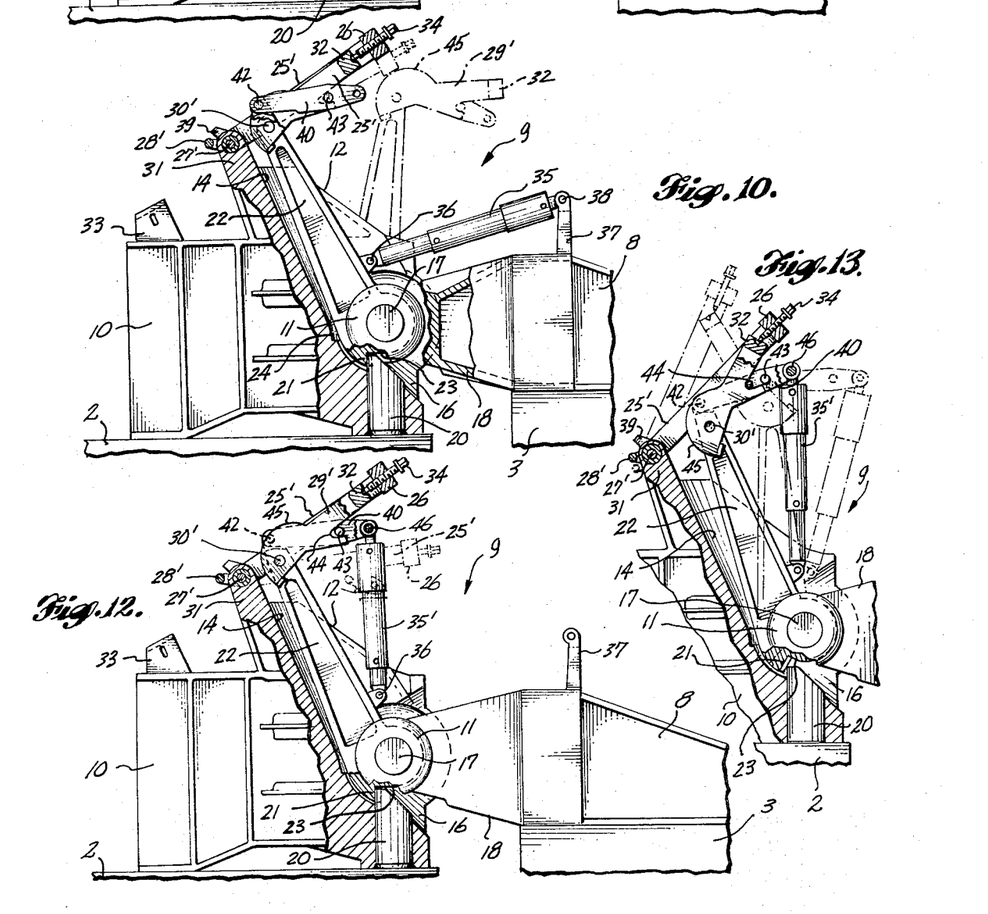
FIG. 10 is a similar side elevation with parts in a different relationship.
FIG. 12 is a side elevation of the coupling with parts in the relationship of FIG. 11, and having portions broken away.
FIG. 13 is a fragmentary side elevation corresponding to FIG. 12 with parts in different relationship.

FIGS. 8, 9 and 10 show a fluid pressure jack 35 having one end connected to lugs on latch lever 22 near its pivot axis by a pivot 36. The opposite end of the jack is connected to a post 37 on the projection component by a pivot 38. In contracted condition, the jack will maintain the latch lever 22 in the unlatched position shown in FIGS. 8 and 9.

When the projection component has been inserted into the socket component, the jack 35 can be extended so as to swing the latch lever 22 into the trough 14 of the socket component and engage the hook 21 with the abutment 20. While the latch lever could be held in such latched position by continuing pressure exerted by the jack 35, it is preferred that the latch lever be locked in such latched position by a toggle clamp lock generally of the type described in connection with FIGS. 3 to 7.

The toggle clamp lock shown in FIGS. 8 to 13 uses elements of the toggle clamp lock shown in FIGS. 3 to 7, but they are rearranged to some extent. The toggle clevis 25, 26 mounted on latch lever 22 by pivot 27 in the coupling of FIGS. 3 to 7 is disconnected from the latch lever and remounted. Because of the different arrangement, the toggle clevis sides of the mechanism shown in FIGS. 8 to 12 are designated 25' and are connected by a pivot pin 27' to the upper portion of the stationary post 31 upstanding from the coupling socket component. This post has a bifurcated lug 39 inclined upwardly from its upper end for engagement by the stop rod 28' extending between the sides 25' of the clevis. Engagement of rod 28' with lug 39, as shown in FIG. 9, limits downward swinging of the lock clevis about its mounting pivot 27'.

The lock strut, which in the coupling of FIGS. 3 to 7, inclusive, was mounted on the upper portion of post 31, is also repositioned in the coupling assembly of FIGS. 8 and 12. The sides of such strut, redesignated as 29', straddle and are mounted on the upper portion of latch lever 22 by a pivot pin 30', as shown best in FIGS. 8, 9 and 10. The lock mechanism of this coupling has a further stop-and-release lever 40, which is nested within the bifurcated lock strut 29', 32. One end of this lever is connected by a pivot 42 in an aperture 41 in the tip of the latch lever 22, which aperture is shown in FIGS. 5 and 7, for swinging lever 40 relative to the lock strut 29', 32.

Stop pins 43 project from opposite sides of the stop-and-release lever 40 at locations spaced a considerable distance from the stop-and-release lever mounting pivot 42. Such stop pins seat in notches 44 in the bifurcations 29' of the lock strut, as shown in FIGS. 8 and 9, to limit downward swinging of such lock strut and the stop-and-release lever about their mounting pivots on the upper end of latch lever 22. The lock strut and stop-and-release lever will therefore be held in a position for nesting between the bifurcations 25' of the lock clevis when the latch lever 22 is swung into its latching position of FIG. 10.

In order to enable the lock strut to move between the bifurcations 25' of the lock lever, when the latch strut 22 is swung from the unlatched position of FIG. 9 to the latched position shown in full lines in FIG. 10 by actuation of the fluid pressure jack 35, the upper edge portions 45 of the lock strut bifurcations 29' adjacent to their mounting pivot 30' are upwardly convex cam surfaces. As the jack 35 swings the lever 22 into the broken-line position shown in FIG. 10, such cam edges 45 engage the lower side of the crossbar 26 of the lock clevis to raise it from its limiting downwardly swung position of FIG. 9. Such raising of the lock clevis enables the lock strut to move between the lock clevis bifurcations 25' as the latch lever 22 is swung into the full-line position of FIG. 10.

When the lock strut cams 45 have thus been moved under the lock clevis crossbar 26, the clevis will swing down until its birufcations 25' are substantially parallel to the bifurcations 29' of the lock strut, the crossbars 26 of the lock clevis and 32 of the lock strut are in adjacent relationship below the projection of a line joining the axes of the lock clevis mounting pivot 27', and the lock strut line pivot 30'. By screwing bolt 34 through lock clevis crossbar 26 into engagement with lock strut crossbar 32, the lock clevis and lock strut will be held in overcenter relationship to lock latch lever 22 positively in position for engagement of hook 21 with abutment 20. The projection-and-socket component of the coupling will thus be held securely in latched relationship.

To release the toggle clamp lock, the crossbar 26 of the lock clevis and the crossbar 32 of the lock strut are raised conjointly from their overcenter positions to their solid-line positions of FIG. 10 to swing the lock clevis and lock strut bifurcations upward correspondingly above the extension of the lines joining the axes of lock clevis pivot 27' and lock strut pivot 30'. If jack 35 is now contracted from the position of FIG. 10, the latch lever 22 will be swung in a clockwise direction, so that the lock strut and lock clevis will be swung upward farther until the lock strut crossbar 32 is disengaged from bolt 34 and the latch lever 22 has been swung into the unlatched solid-line position of FIG. 9 to release the hook 21 from the socket abutment 20.

Figure 11:
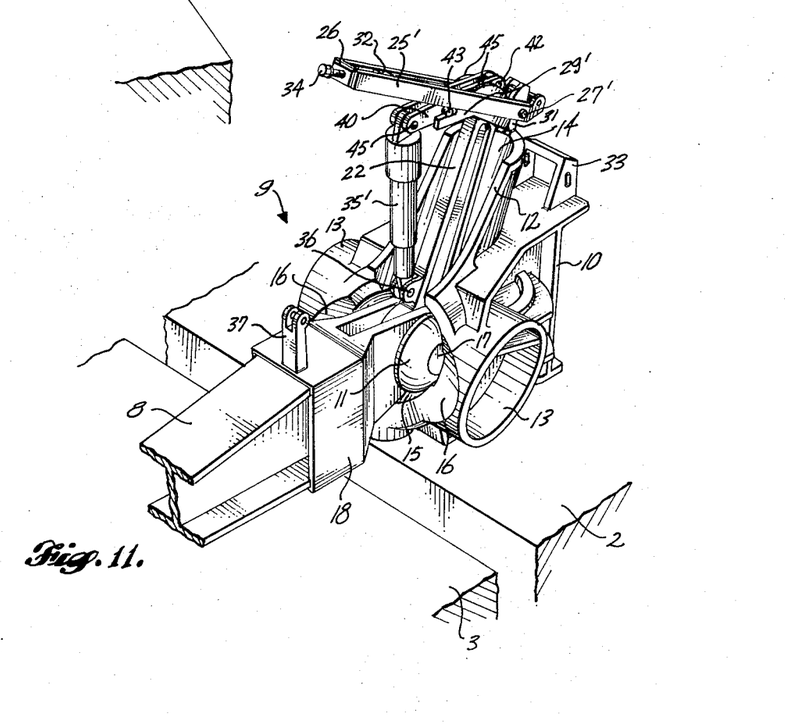
FIG. 11 is a top perspective of the coupling, with the coupling components engaged, but having parts in still a different relationship.

To be able to hold the toggle clamp lock mechanism in positively locked position, and also to be able to release such lock mechanism by remote control, especially in case of emergency, components of the latch mechanism can be rearranged, as illustrated in FIGS. 11, 12 and 13. In this case, the jack 35' is repositioned so that its end remote from latch lever mounting pivot 36, instead of being connected to the post 37 on the projection component, is connected by pivot 46 to the end of stop-and-release lever 40 remote from pivot 42 mounting such lever on the tip of latch lever 22.

When the jack 35' is in its fully-retracted position, the stop pin 43 of the stop-and-release lever 40 will be held seated in notches 44 of the lock strut bifurcations 29'. Such lock strut and, consequently, the lock clevis will therefore be held in their overcenter locked positions, shown in broken lines in FIG. 12. When the jack 35' is extended, as shown in FIGS. 11 and 12, however, the stop-and-release lever 40 will be moved upward to swing the lock clevis and lock strut upward so that their crossbars 26 and 32, respectively, are disposed a substantial distance above the projection of the line connecting lock clevis pivot 27' and lock strut pivot 30' as shown in FIG. 13. Application of a force tending to pull the projection-and-socket components of the coupling apart will then cause the lock clevis to be swung upward farther about its pivot until the lock mechanism is released, and the latch member 22 can be swung by pressure of the abutment 20 on the latch lever hook 21 to enable the hook to escape over the abutment for disconnection of the coupling components.

I claim:

1. Marine coupling mechanism comprising a projection member projecting substantial horizontally in cantilever fashion and carrying a ball-shaped plug, an upstanding socket member having a cavity of generally spherically arcuate shape with an open side for receiving said plug in interfitting relationship by horizontal approach movement of said projection member and said socket member, said plug and said cavity being curved substantially concentrically in such interfitting relationship, a boss upstanding from the bottom of said socket cavity, a hook engageable with said boss, and pivot means carried by said plug and mounting said hook on said plug for swinging about a substantially horizontal axis substantially concentric with said plug for engaging said hook with said boss.

2. The marine coupling defined in claim 1, and a lever extending upward from the plug, carrying the hook and swingable for moving the hook into and out of latching engagement with the boss.

3. The marine coupling defined in claim 2, and readily releasable toggle clamp means for holding the lever immovable relative to the projection member in position with the hook in latching engagement with the boss.

4. The marine coupling defined in claim 3, in which the toggle clamp means connects the swinging end portion of the lever and the socket member.

5. The marine coupling defined in claim 3, and power means for swinging the toggle clamp means relative to the lever means.

* * * * *

PO-1050
(5/69)

UNITED STATES PATENT OFFICE
CERTIFICATE OF CORRECTION

Patent No. 3,800,733     Dated April 2, 1974

Inventor(s) Harold H. West

It is certified that error appears in the above-identified patent and that said Letters Patent are hereby corrected as shown below:

Column 2, line 65, cancel "being" and insert --a boss--.

Column 8, line 5, cancel "substantial" and insert --substantially--; line 34, cancel the word "means".

Signed and sealed this 13th day of August 1974.

(SEAL)
Attest:

McCOY M. GIBSON, JR.
Attesting Officer

C. MARSHALL DANN
Commissioner of Patents